United States Patent
Koenig et al.

(10) Patent No.: US 11,387,673 B2
(45) Date of Patent: Jul. 12, 2022

(54) SECONDARY COIL UNIT COMPRISING A SERVICE OPENING

(71) Applicant: Bayerische Motoren Werke Aktiengesellschaft, Munich (DE)

(72) Inventors: Hartmut Koenig, Hebertshausen (DE); Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 14 days.

(21) Appl. No.: 15/991,050

(22) Filed: May 29, 2018

(65) Prior Publication Data

US 2018/0272876 A1 Sep. 27, 2018

Related U.S. Application Data

(63) Continuation of application No. PCT/EP2016/079142, filed on Nov. 29, 2016.

(30) Foreign Application Priority Data

Nov. 30, 2015 (DE) ...................... 10 2015 223 615.3

(51) Int. Cl.
*H02J 50/00* (2016.01)
*H01F 38/14* (2006.01)
(Continued)

(52) U.S. Cl.
CPC ............ *H02J 50/005* (2020.01); *B60L 53/12* (2019.02); *H01F 38/14* (2013.01); *H02J 50/10* (2016.02)

(58) Field of Classification Search
CPC ......... B60L 11/182; B60L 53/12; H02J 7/025; H02J 50/005; H02J 50/10; H01F 38/14; Y02T 90/122
(Continued)

(56) References Cited

U.S. PATENT DOCUMENTS 5,216,402 A * 6/1993 Carosa .................... B60L 53/12
336/83
5,264,776 A * 11/1993 Hulsey .................. B60L 3/0069
320/108
(Continued)

FOREIGN PATENT DOCUMENTS

CN 101795023 A 8/2010
CN 103532249 A 1/2014
(Continued)

OTHER PUBLICATIONS

International Search Report (PCT/ISA/210) issued in PCT Application No. PCT/EP2016/079142 dated Feb. 13, 2017 with English translation (five pages).
(Continued)

*Primary Examiner* — Richard Isla
*Assistant Examiner* — Manuel Hernandez
(74) *Attorney, Agent, or Firm* — Crowell & Moring LLP

(57) ABSTRACT

A secondary coil unit for a vehicle has a housing with a cover that can be removed from the housing. The secondary coil unit further has a secondary coil which is arranged in the housing and surrounds a core region. The cover and the housing are designed in such a way that an opening through the secondary coil unit is created when the cover is removed from the housing.

13 Claims, 2 Drawing Sheets

(51) Int. Cl.
  *B60L 53/12* (2019.01)
  *H02J 50/10* (2016.01)
(58) Field of Classification Search
  USPC .......................................... 320/108; 307/104
  See application file for complete search history.

(56) References Cited

U.S. PATENT DOCUMENTS

| | | | | |
|---|---|---|---|---|
| 5,379,021 | A | * | 1/1995 | Ito ........................... B60L 53/12 |
| | | | | 336/212 |
| 5,973,583 | A | * | 10/1999 | Watanabe ................ H01F 38/14 |
| | | | | 336/59 |
| 6,127,800 | A | * | 10/2000 | Kuki ..................... B60L 11/182 |
| | | | | 320/108 |
| 8,269,595 | B2 | * | 9/2012 | Okada ..................... H02J 50/70 |
| | | | | 336/200 |
| 2005/0075700 | A1 | * | 4/2005 | Schommer ........... A61N 1/3787 |
| | | | | 607/61 |
| 2008/0204182 | A1 | | 8/2008 | Simon et al. |
| 2013/0057203 | A1 | * | 3/2013 | Jones ................... H02J 7/0042 |
| | | | | 320/108 |
| 2017/0025902 | A1 | * | 1/2017 | Yuasa .................. B60L 53/305 |
| 2017/0033606 | A1 | * | 2/2017 | Maikawa ................ H02J 50/10 |
| 2017/0237295 | A1 | * | 8/2017 | Yuasa ................. H01F 27/2804 |
| | | | | 307/104 |
| 2018/0025826 | A1 | * | 1/2018 | Nishimura ............... B60M 7/00 |
| | | | | 336/199 |
| 2021/0075362 | A1 | * | 3/2021 | Chaintreuil ............. H02J 3/381 |

FOREIGN PATENT DOCUMENTS

| | | | |
|---|---|---|---|
| CN | 204659475 U | 9/2015 | |
| DE | 10 2005 029 599 B3 | 12/2006 | |
| DE | 10 2011 118 397 A1 | 5/2012 | |
| DE | 10 2012 103 302 A1 | 10/2013 | |
| DE | 10 2014 203 037 A1 | 8/2015 | |
| JP | 2014-117058 A | 6/2014 | |
| WO | WO 2013/156168 A2 | 10/2013 | |
| WO | WO-2014191880 A1 * | 12/2014 | |
| WO | WO-2015155835 A1 * | 10/2015 | .............. H02J 7/025 |
| WO | WO-2015159466 A1 * | 10/2015 | .............. H02J 50/70 |

OTHER PUBLICATIONS

Chinese Office Action is Chinese application No. 201680059386.0 dated Jun. 10, 2020, with English translation (Twelve (12) pages).

* cited by examiner

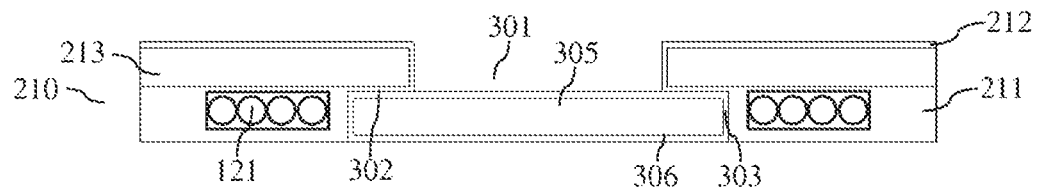
Fig. 3A
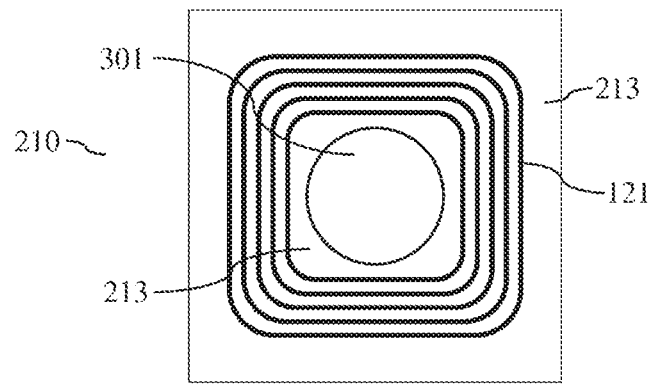
Fig. 3B
Fig. 3C
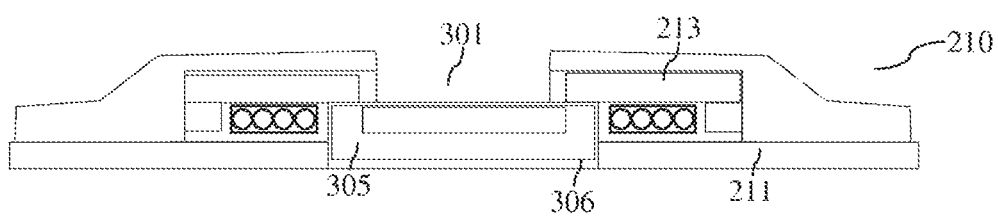
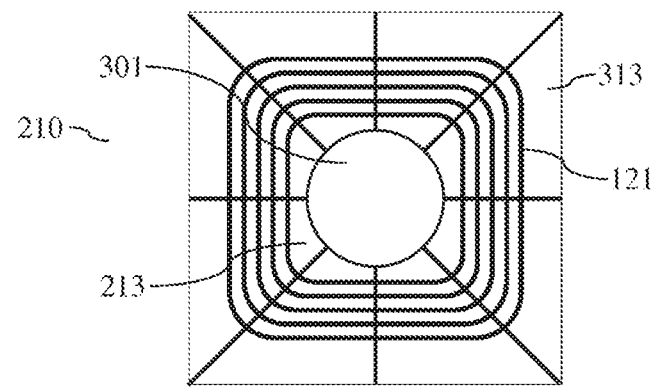
Fig. 3D

SECONDARY COIL UNIT COMPRISING A SERVICE OPENING

CROSS REFERENCE TO RELATED APPLICATIONS

This application is a continuation of PCT International Application No. PCT/EP2016/079142, filed Nov. 29, 2016, which claims priority under 35 U.S.C. § 119 from German Patent Application No. 10 2015 223 615.3, filed Nov. 30, 2015, the entire disclosures of which are herein expressly incorporated by reference.

BACKGROUND AND SUMMARY OF THE INVENTION

The invention relates to a charging coil for the inductive charging of an electric energy storage system of a motor vehicle.

Vehicles with an electric drive typically have a battery, in which electrical energy can be stored to operate an electric motor of the vehicle. The battery in the vehicle can be charged with electrical energy from a power supply network. For this purpose, the battery is coupled with the power supply network in order to transfer the electrical energy from the power supply network into the vehicle battery. The coupling can be established by wire (via a charging cable) and/or wirelessly (using an inductive coupling between a charging station and the vehicle).

One approach to the automatic, wireless, inductive charging of the vehicle battery involves transferring electrical energy to the battery from the ground to the undercarriage of the vehicle by magnetic induction through the undercarriage clearance. An example of this is shown in FIG. 1. In particular, FIG. 1 shows a vehicle 100 with a storage system 103 for electrical energy (e.g. with a chargeable battery 103). The vehicle 100 includes a secondary coil 121 on the vehicle undercarriage, wherein the secondary coil 121 is connected to the storage system 103 for electrical energy by impedance matching, which is not shown, and a rectifier 101. The secondary coil 121 is typically a component of a so-called "wireless power transfer" (WPT) vehicle unit 120.

The secondary coil 121 of the WPT vehicle unit 120 can be positioned above a primary coil 111, wherein the primary coil 111 is placed on the floor of a garage, for example. The primary coil 111 is typically a component of a so-called WPT floor unit 110. The primary coil 111 is connected to a power supply 113. The power supply 113 can include a radio frequency generator and/or an inverter, which generates AC (alternating current) in the primary coil of the WPT floor unit 110, as a result of which a magnetic field (in particular an electromagnetic charging field) is induced. The electromagnetic charging field can have a predefined charging field frequency range. The charging field frequency of the electromagnetic charging field can fall in the range of 80-90 kHz (especially 85 kHz).

When there is a sufficient magnetic coupling between the primary coil 111 of the WPT floor unit 110 and the secondary coil 121 of the WPT vehicle unit 120 via the undercarriage clearance 130, a corresponding voltage and thus a current is induced in the secondary coil 121 by the magnetic field. The induced current in the secondary coil 121 of the WPT vehicle unit 120 is rectified in the rectifier 101 and stored in the storage system 103. In this way, electrical energy can be transferred from the power supply 113 to the energy storage system 103 of the vehicle 100 without using a cable. The charging process can be controlled in the vehicle 100 by a charging control device 105. To this end, the charging control device 105 can be configured to communicate e.g. wirelessly with the WPT floor unit 110.

The secondary coil 121 is typically installed in a housing and covers a relatively large surface on the undercarriage of a vehicle 100. The space requirements of a secondary coil 121 thus typically increase as the charging capacity and/or undercarriage clearance 130 increases.

The present document addresses the technical problem of allowing for large secondary coils 121 in a vehicle 100 in an efficient way (e.g. for high charging capacities). In so doing, large secondary coils 121 should be provided particularly in such a way that they interfere as little as possible with other vehicle functions and especially with access to other components of a vehicle.

According to one aspect, a secondary coil unit for a vehicle is described. The secondary coil unit can be used in particular to receive electrical energy via a charging field to charge an electrical energy storage unit of the vehicle. The secondary coil unit can be part of the WPT vehicle unit of a vehicle, for example. In particular, the secondary coil unit can be attached to the undercarriage of the vehicle and can be connected by a connection cable to a rectifier in the WPT vehicle unit.

The secondary coil unit includes a housing with a cover, which cover can be removed from the housing. Moreover, the secondary coil unit includes a secondary coil which is arranged in the housing and which encloses a core area. The cover and the housing are configured such that an opening through the secondary coil unit is created in the core area by removing the cover from the housing. In particular, the opening can be designed such that, when the secondary coil unit is in the installed state, the opening permits access to one or more components (such as an oil pan) in an area of the vehicle undercarriage that is covered by the secondary coil unit.

The secondary coil unit thus permits efficient access to components on the undercarriage of a vehicle. Here, the cover typically does not include any electrical and/or current-conducting elements, since these are typically located outside of the core area. Safe access to components on the undercarriage of a vehicle can be ensured in this way. On the other hand, providing this type of opening within a secondary coil unit permits the use of secondary coils that cover a relatively large surface of the undercarriage of a vehicle. Providing an opening thus allows for the use of large secondary coils, e.g. to increase the charging capacity of an inductive charging system.

The cover can have a cover layer consisting of a coil core material. The coil core material here typically comprises one or more ferromagnetic and/or ferrimagnetic materials (in particular ferrite). The cover layer can thereby contribute to guiding the field lines of the charging field. This cover layer can extend at least partly into the core area when the cover is arranged on the housing. The inductance of the secondary coil and the coupling factor of a primary coil can be increased by the cover layer so as to permit higher charging capacities.

The secondary coil unit can have a housing layer consisting of a coil core material, wherein the coil core material typically comprises one or more ferromagnetic and/or ferrimagnetic materials. In this case, the housing layer is located in the housing of the secondary coil unit (and not in the cover of the secondary coil unit). In particular, the housing layer can be fixed to the secondary coil. The housing layer can cover at least one side of the secondary coil (in particular the upper side or the side facing away from the primary coil), wherein the housing layer has an opening in the vicinity of the core area. Here, the housing layer can extend in a surface perpendicular to a longitudinal axis of the secondary coil. The inductance of the secondary coil can be further increased by the housing layer.

The housing layer and the cover layer can be configured in such a way that the housing layer and the cover layer partially overlap when the cover is arranged on the housing. An overlap such as this can reduce a magnetic resistance between the housing layer and the cover layer, thereby permitting an increased coupling factor between the secondary coil and the primary coil.

The housing layer can be divided into a plurality of segments, which are all separated from one another by a gap. This is advantageous, since damage to the housing layer caused by mechanical forces can be prevented by the segmentation of the housing layer. On the other hand, the cover layer can be continuous and have no segmentation. The magnetic flux in the individual segments of the housing layer can then be combined by the cover layer, which is advantageous with regard to the coupling factor of the secondary coil to the primary coil.

The housing can have a first protective layer, and the cover can have a second protective layer. The protective layers in this instance are arranged on a side of the secondary coil unit facing away from the vehicle when the secondary coil unit is in the installed state. The protective layers can thus protect the secondary coil unit from rock chipping and/or from other mechanical strain that can come from the roadway. The protective layers can be a composite material and/or a fiber-reinforced synthetic (e.g. a polymer fiber-reinforced, glass fiber-reinforced or aramid fiber-containing synthetic material).

By providing a separate cover that can be detached from the housing of the secondary coil unit, it is possible to configure the second protective layer thinner than the first protective layer. In particular, an increased probability of damage to the cover can be accepted, since a damaged cover (in contrast to an entire secondary coil unit) is cost-effective to replace. Using a relatively thin second protective layer makes it possible to introduce a ferromagnetic or ferrimagnetic cover layer as close as possible to a primary coil and thereby achieve a high coupling factor.

The cover and the housing can include fasteners, with which the cover can be (detachably) locked or fastened to the housing. The fasteners can include e.g. a screw connection and/or preferably a bayonet connection.

The secondary coil can have, for example, a circular coil (with a core area) and/or a double-D coil (with two core areas).

The secondary coil unit typically has a planar expansion along an expansion surface, which runs parallel to the undercarriage of the vehicle (and perpendicular to the longitudinal axis of the secondary coil) when the secondary coil unit is in the installed state. Field lines of a magnetic field in the core area can then run perpendicular to the expansion surface (and parallel to the longitudinal axis of the secondary coil).

According to a further aspect, an (inductive) charging device (such as a WPT vehicle unit) for a vehicle is described. The charging device comprises a secondary coil unit as described in this document. Moreover, the charging device comprises a control unit (such as a charging control device), which is configured to determine whether the cover of the secondary coil unit is arranged on the housing. In particular, the control unit can be designed to determine an indicator for an inductance of the secondary coil of the secondary coil unit. Based on the indicator for the inductance, it is then possible to determine whether the cover of the secondary coil unit is arranged on the housing.

The control unit can additionally be designed to inform a user of the vehicle that the cover of the secondary coil unit is not arranged on the housing. In this way, it is possible to avoid damage to the secondary coil unit during vehicle operation and/or reduced charging capacities during charging operation.

According to a further aspect, a motor vehicle (in particular a road vehicle such as a car, a truck or a motorcycle) is described which has the secondary coil unit described in the present document.

It should be noted that the devices and systems described in the present document can be used both individually and in combination with other devices and systems described in this document. Moreover, any aspects of the devices and systems described in this document can be combined in many ways. In particular, the features of the claims can be combined with each other in many different ways.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3A shows an exemplary secondary coil unit with a removable cover in a side view.

FIG. 3B shows an exemplary secondary coil unit with a removable cover in a top view.

FIG. 3C shows an exemplary secondary coil unit with a cover having an expanded coil core and/or having an expanded cover layer consisting of coil core material (such as ferrite).

FIG. 3D shows an exemplary secondary coil unit with a segmented coil core.

DETAILED DESCRIPTION OF THE DRAWINGS

Figure 1:
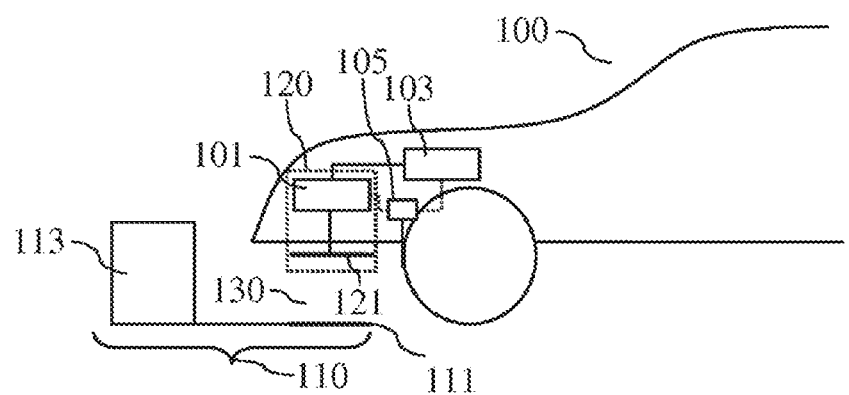
FIG. 1 shows exemplary components of an inductive charging system.
Figure 2A:
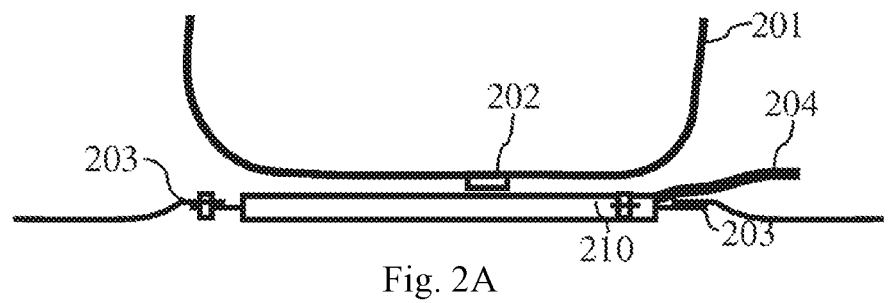
FIG. 2A shows an exemplary arrangement of a secondary coil unit on the undercarriage of a vehicle.

As was explained earlier, the present document is concerned with providing secondary coils 121 with large surface areas for an inductive charging system for the charging of the energy storage system 103 of a vehicle 100. FIG. 2A shows an exemplary arrangement of a secondary coil unit 210 (with a secondary coil 121) on the undercarriage of a vehicle 100. The secondary coil unit 210 is typically attached to one or more carriers of the vehicle 100 by fasteners 203. Furthermore, the secondary coil unit 210 is typically coupled with the rectifier 101 by a connection cable 204.

In the example shown, the secondary coil unit 210 covers the discharge 202 of an oil pan 201 of the vehicle 100. A situation such as this can occur in hybrid vehicles in particular, which have both an internal combustion engine and an electric motor to drive the vehicle 100. To permit access to the discharge 202 (e.g. for an oil change), the secondary coil unit 210 must be removed. This is typically associated with a high expenditure of time. Additionally, a plug connection between the secondary coil unit 210 and the connection cable 204 can be compromised by the removal. Furthermore, a high degree of safety requirements must typically be satisfied for the removal because voltages may be present in the connection cable 204.

A large secondary coil unit 210 thus impedes access to components 201, 202 of the vehicle 100 that are covered by the secondary coil unit 210. In order to ameliorate this problem, the size of the secondary coil unit 210 can be limited, but doing so also limits the maximum possible charging capacity of the inductive charging system.

Figure 2B:
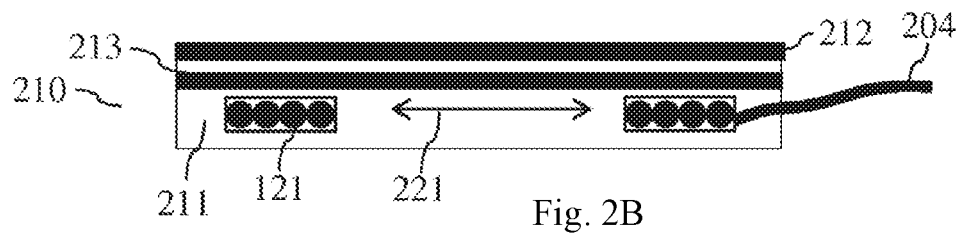
FIG. 2B shows an exemplary secondary coil unit in a side view.
Figure 2C:
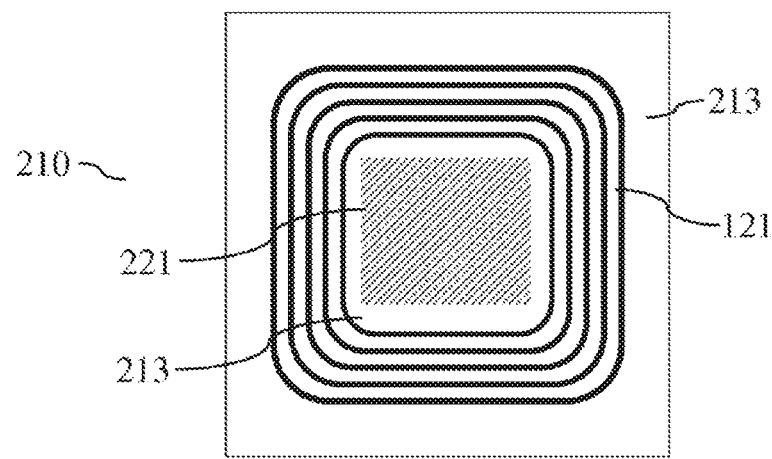
FIG. 2C shows an exemplary secondary coil unit in a top view.

FIG. 2B shows a side view of an exemplary design of a secondary coil unit 210. The secondary coil unit 210 includes the secondary coil 121, a housing layer 213 consisting of ferromagnetic or ferrimagnetic material (e.g. ferrite) and a housing 212, 211 (e.g. with a stabilizing rear housing wall 212 and a protective covering or protective layer 211). As can be seen in FIG. 2C, a circular or possibly a double-D secondary coil 121 is typically employed, which permits the construction of a relatively flat secondary coil 121. Both coil types enclose at least one core area 221 (two core areas in the case of a double-D secondary coil 121), which is typically filled with ferromagnetic or ferrimagnetic material in order to allow for the highest possible coupling factor to the primary coil 111.

The core area 221 of the secondary coil unit 210 that is enclosed by the (possibly circular) secondary coil 121 can be used effectively to provide an opening in the secondary coil unit 210. Components 201, 202 of the vehicle 100 that are covered can be made accessible through the opening, without the secondary coil unit 210 having to be removed. Providing this type of opening thus allows for the use of large secondary coil units 210 (which permit a high charging capacity) and nevertheless ensure simple access to the covered components 201, 202 of the vehicle 100.

FIG. 3A shows a side sectional view of an exemplary design of a secondary coil unit 210 with a removable cover 301. Here, the removable cover 301 has a cover layer 305 with a (ferromagnetic or ferrimagnetic) coil core material to permit the highest possible coupling factor with the primary coil 111. The cover 301 thus (at least partially) assumes the function of the ferromagnetic or ferrimagnetic housing layer 213 of the secondary coil unit 210. The cover layer 305 of the cover 301 is preferably in contact with the (remaining) housing layer 213 of the secondary coil unit 210. In particular, a transition 302 between the cover layer 305 of the cover 301 and the housing layer 213 of the secondary coil unit 210 includes the greatest possible overlap and the smallest possible distance, and so the smallest possible magnetic resistance arises at the transition 302.

The cover 301 can be locked to the housing 211, 212 of the secondary coil unit 210 by means of a suitable fastener 303 (e.g. a bayonet connection and/or a screw connection). Therefore, in the closed state, the secondary coil unit 210 with the cover 301 largely has the same properties as a secondary coil unit 210 without a cover 301 with regard to an inductive charging process. On the other hand, the cover 301 permits simple access to components 201, 202 of the vehicle 100 that are covered by the secondary coil unit 210. This is apparent in particular from FIG. 3B, which shows a top view of a secondary coil unit 210 with a cover 301.

The cover 301 can consist largely of a ferromagnetic or ferrimagnetic cover layer 305. The cover 301 can be stabilized by relatively thin materials (e.g. by composite materials). In other words, the cover 301 can have a relatively thin protective layer 306. In contrast to the rest of the secondary coil unit 210, comprehensive protection of the cover 301 is not necessary, since a defective cover 301 can be replaced relatively cost-efficiently as required. In this way, it becomes possible (as is shown in FIG. 3C) to apply the ferromagnetic or ferrimagnetic cover layer 305 of the cover 301 closer to the primary coil 111 (compared to a secondary coil unit 210 without a cover 301), and so the coupling factor and thus the maximum charging capacity can be increased.

Furthermore, the use of a cover 301 allows the ferromagnetic or ferrimagnetic housing layer 213 to be segmented into separate ferromagnetic or ferrimagnetic segments 313. The magnetic flux in the individual segments 313 can be combined by the (unsegmented) cover 301. By segmenting the ferromagnetic or ferrimagnetic housing layer 213, breaks in the typically brittle ferromagnetic or ferrimagnetic material can be avoided.

The charging control device 105 can be configured to determine whether or not the cover 301 is arranged on the secondary coil unit 210. In this way, a user of the vehicle 100 can be shown when the secondary coil unit 210 is not closed with the cover 301 and when there is a risk of damage to the secondary coil unit 210 (during vehicle operation) or a reduced coupling factor and/or a reduced charging capacity (during charging operation) as a result. To this end, the vehicle 100 can have means with which the inductance of the secondary coil 121 can be measured. For instance, a resonance frequency of the oscillating circuit of the WPT vehicle unit 120 enclosing the secondary coil 121 can be determined. The inductance of the secondary coil 121 can then be determined from the resonance frequency. When the detected inductance lies below a predefined inductance threshold value, it is possible to conclude therefrom that the cover 301 is not arranged on the secondary coil unit 210. This measurement can also be carried out without a primary coil 111 (e.g. during vehicle operation).

Alternatively, one or more transmission parameters for a charging process (e.g. a frequency of the charging field by which a charging capacity is maximized) can be determined during charging operation. Based on the transmission parameters, it is then possible to determine whether the cover 301 is arranged on the secondary coil unit 210.

Thus a secondary coil unit 210 with a service opening is described. The service opening is provided in a core area 221 of the secondary coil unit 210, in which no current-conducting components are disposed. The service opening can thereby be provided in a cost-efficient way. In the inner part of the secondary coil unit 210 (i.e. in the core area 221 of the secondary coil 121), a cover 301 is provided that contains only one or a plurality of ferromagnetic or ferrimagnetic materials (e.g. ferrites) as well as a housing and/or a protective layer for stabilization. The cover 301 typically does not contain any electric components of the secondary coil unit 210.

As has previously been explained, the attachment 303 of the cover 301 can be implemented by means of a bayonet connection and/or by a screw connection. If possible, the broadest possible overlap 302 is established between the ferromagnetic or ferrimagnetic materials in the cover 301 and the housing 211, 212 of the secondary coil unit 210 in order to optimize the field flux in the secondary coil unit 201. The ferromagnetic or ferrimagnetic material of the cover 301 can extend into a region below the secondary coil 121 so that the magnetic distance between the secondary coil unit 210 (with the cover 301) and a primary coil 111 can be reduced.

The cover 301 and possibly the secondary coil unit 210 can be laminated into composite materials. In this way, it is possible to provide stabilization and protection from mechanical influences in a compact manner.

A diagnostic function can be provided (e.g. by the charging control device 104), which uses the inductance values of the coils 111, 121 of the charging system (in particular the secondary coil 121) to ascertain whether or not the cover 301 is in place. Parameters of the coils can be monitored for this purpose. This can also take place on-board without the presence of a primary coil 111. The diagnosis of the cover status during the charging operation can be carried out by monitoring the charging parameters and/or transmission parameters. Alternatively or additionally, a separate sensor can be provided for cover diagnosis, which determines directly whether or not the cover 301 is arranged on the housing 211, 212 of the secondary coil unit 210.

A service opening for a secondary coil unit 210 can be utilized for various coil types (especially for circular coils and/or for double-D coils) that have a sufficiently large core area 221, which runs parallel to the undercarriage of the vehicle 100.

The robustness of the remaining secondary coil unit 210 (without the cover 301) can be increased in particular by the segmentation of the ferromagnetic and ferrimagnetic material of the housing layer 213 of the secondary coil unit 210. The cover 301 can then combine the magnetic flux of the individual segments 313.

Simple access to components 201, 202 of a vehicle 100 lying behind the secondary coil unit 210 is made possible by a service cover 301. No electrical components of the secondary coil unit 210 have to be moved in order to remove and then return the cover 301, and so no special safety measures are necessary. Moreover, complicated routing designs for the removal of the secondary coil unit 210 can be avoided. In addition, providing a cover 301 in the secondary coil unit 210 reduces the probability that the secondary coil unit 210 will be damaged by mechanical forces (e.g. by rock chipping or driving off the road shoulder). In many cases, mechanical stresses result in damage only to the cover 301, which can be replaced cost-efficiently. Operating costs for the vehicle 100 can be reduced in this way.

The present invention is not limited to the embodiments shown. It should be noted in particular that the description and the drawings are intended only to illustrate the principle of the proposed devices and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A secondary coil unit for a vehicle, comprising:
a housing with a cover, which cover is removable from the housing; and
a secondary coil arranged in the housing and enclosing a core area, wherein the cover and the housing are configured such that an opening through the secondary coil unit is created in the core area by removing the cover from the housing so as to permit physical maintenance access through the opening to vehicle undercarriage components arranged behind the housing opposite the cover, wherein the secondary coil is configured such that a primary coil of a WPT floor unit induces a current in the secondary coil through an undercarriage clearance distance; and
a connection cable connecting the secondary coil to an electrical energy storage, wherein the connection cable does not pass through the opening.

2. The secondary coil unit as claimed in claim 1, wherein the cover comprises a cover layer made of a coil core material, and
the cover layer extends at least partly into the core area when the cover is arranged on the housing.

3. The secondary coil unit as claimed in claim 2, wherein the secondary coil has a housing layer made of a coil core material, and
the housing layer and the cover layer are configured such that the housing layer and the cover layer partially overlap when the cover is arranged on the housing.

4. The secondary coil unit as claimed in claim 3, wherein the housing layer comprises a plurality of segments, which are all separated from one another by a gap.

5. The secondary coil unit as claimed in claim 4, wherein the housing comprises a first protective layer and the cover comprises a second protective layer, which are arranged on a side of the secondary coil unit facing away from the vehicle when the secondary coil unit is in the installed state, and
the second protective layer is thinner than the first protective layer.

6. The secondary coil unit as claimed in claim 5, wherein the cover and the housing comprise fasteners, with which the cover is lockable to the housing, and
the fasteners include a threaded connection and/or a bayonet connection.

7. The secondary coil unit as claimed in claim 1, wherein the housing comprises a first protective layer and the cover comprises a second protective layer, which are arranged on a side of the secondary coil unit facing away from the vehicle when the secondary coil unit is in the installed state, and
the second protective layer is thinner than the first protective layer.

8. The secondary coil unit as claimed in claim 1, wherein the cover and the housing comprise fasteners, with which the cover is lockable to the housing, and
the fasteners include a threaded connection and/or a bayonet connection.

9. The secondary coil unit as claimed in claim 1, wherein the secondary coil comprises a circular coil and/or a double-D coil,
the secondary coil unit has a planar expansion along an expansion surface, which runs parallel to an undercarriage of the vehicle when the secondary coil unit is in the installed state, and
field lines of a magnetic field in the core area run perpendicular to the expansion surface.

10. The secondary coil unit as claimed in claim 1, wherein the secondary coil comprises a circular coil and/or a double-D coil, and
field lines of a magnetic field in the core area run perpendicular to the expansion surface.

11. The secondary coil unit as claimed in claim 1, wherein the secondary coil unit has a planar expansion along an expansion surface, which runs parallel to an undercarriage of the vehicle when the secondary coil unit is in the installed state, and
field lines of a magnetic field in the core area run perpendicular to the expansion surface.

12. A charging device for a vehicle, comprising:
a secondary coil unit according to claim 1; and
a control unit that is operatively configured to determine whether the cover of the secondary coil unit is arranged on the housing.

13. The charging device as claimed in claim 12, wherein the control unit is further operatively configured to:
determine an indicator for an inductance of the secondary coil of the secondary coil unit; and
determine whether the cover of the secondary coil unit is arranged on the housing based on the indicator for the inductance.

\* \* \* \* \*